Feb. 3, 1953

A. HOCK 2,627,349

STRAINER

Filed Nov. 7, 1946

INVENTOR.
ALVIN HOCK
BY
Joseph A. Pave
Attorney.

Feb. 3, 1953 A. HOCK 2,627,349
STRAINER
Filed Nov. 7, 1946 5 Sheets-Sheet 2

INVENTOR.
ALVIN HOCK
BY
Joseph A. Rave
Attorney.

Feb. 3, 1953 A. HOCK 2,627,349
STRAINER
Filed Nov. 7, 1946 5 Sheets-Sheet 3

INVENTOR.
ALVIN HOCK
BY Joseph A. Rave
ATTORNEY

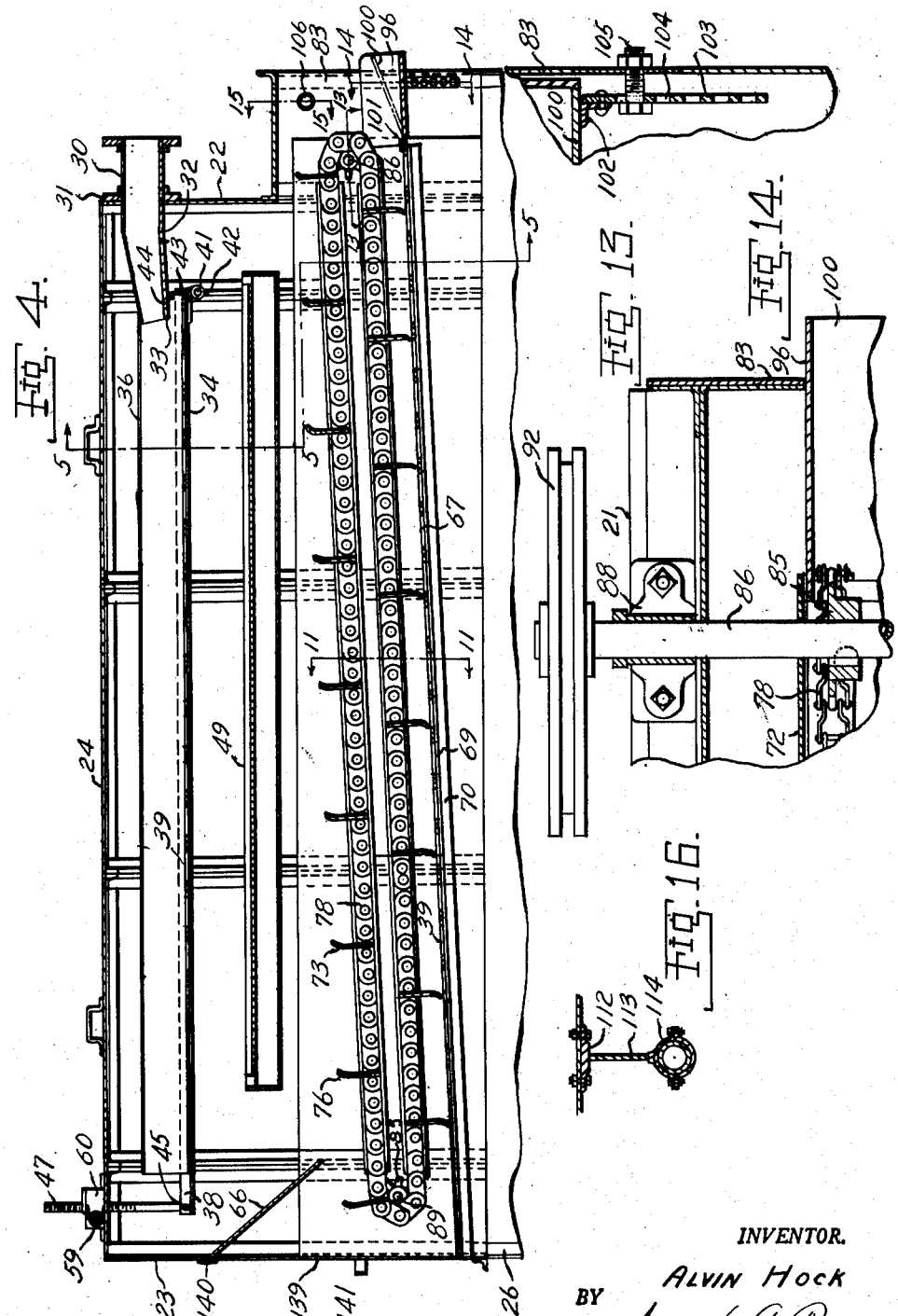

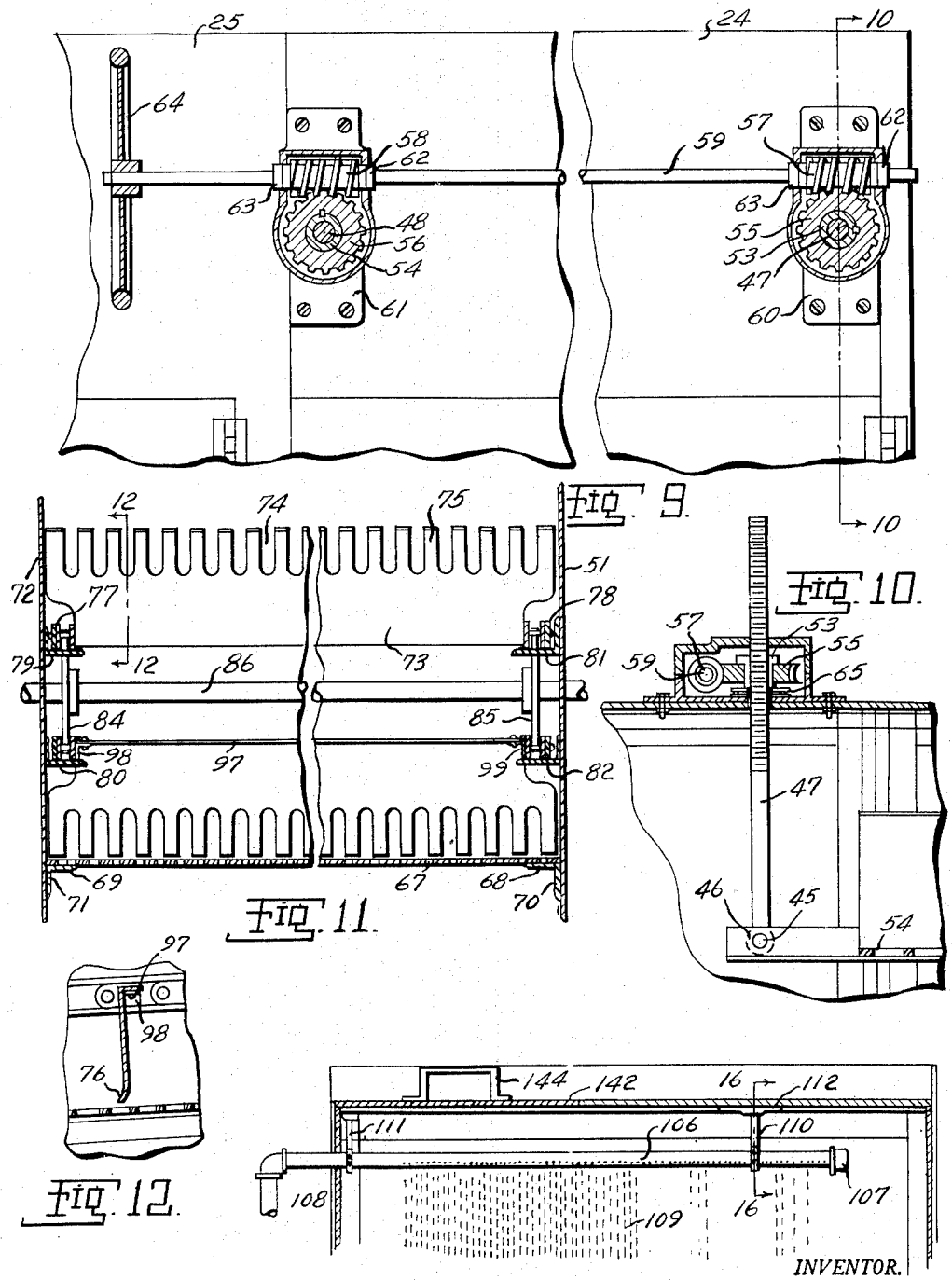

Patented Feb. 3, 1953

2,627,349

UNITED STATES PATENT OFFICE 2,627,349

STRAINER

Alvin Hock, Cincinnati, Ohio

Application November 7, 1946, Serial No. 708,261

10 Claims. (Cl. 210—151)

This invention relates to improvements in separators for straining or separating liquids, syrups or the like from solid particles, such for example as straining wort from the hops and cereals used in making beer after the same has been boiled or brewed.

The strainer of the present invention is an improvement on that disclosed in applicant's copending application Serial No. 488,068, now Patent No. 2,412,400.

The principal object of the present invention is the provision of a strainer or separator for straining and separating liquids from solid particles.

Another object of the present invention is the provision of a strainer for straining or separating a liquid from solid particles in progressive stages, such as, first by permitting the run off of the main liquid and then processing the solid particles to permit the recovery of all the liquid that may be still clinging to the said solid particles.

A further object of the present invention is the provision of a strainer for straining or separating liquid from solid particles in progressive stages such as by first permitting the run off of the main liquid, by gravity, from the solid particles which are substantially suspended in the liquid and moving therewith, then mechanically tumbling the said solid particles to expose any hidden surfaces, pockets or crevices therein and permit the gravity flow of the liquid from said solid particles and subsequently judiciously sparging or washing the said solid particles and thereby obtain the maximum of the liquid, syrup, wort or the like.

A still further object of the present invention is the provision in a strainer of the character above identified of improved tumbling means for the solid particles whereby the said solid particles are adequately tumbled to obtain the maximum recovery of liquid, syrup, wort or the like without squeezing, or crushing said solid particles to thereby avoid undesirable fluids entering the liquid from said solid particles which may result from said squeezing, or bruising, such for example, as the squeezing or bruising of hop flowers in the manufacture of syrup or wort from which beer is subsequently made.

It is also an object of the present invention to provide a strainer of the kind above set forth in which means are provided, so that access may be readily had to the interior thereof for cleaning purposes to prevent the adherence of residue to the interior of the strainer, which may affect the quality of batches subsequently passed through the strainer.

It is a still further object of the present invention to provide in a strainer of the kind set forth in the paragraph immediately above, means for mounting the parts thereof so that they may be arranged to expose all surfaces for the purpose of cleaning and sterilizing the same.

Other objects and advantages of the present invention should be readily apparent by reference to the following specification considered in conjunction with the accompanying drawings forming a part thereof and it is to be understood that any modifications may be made in the exact structural details there shown and described, without departing from or exceeding the spirit of the above invention.

In the drawings:

Fig. 2 is a top plan view of the strainer illustrated in Fig. 1.

Fig. 4 is a longitudinal sectional view through the strainer of the present invention taken on line 4—4 on Fig. 2.

Fig. 6 is an enlarged fragmentary top plan view of a portion of a strainer plate used with the strainer of the present invention and forming a detail thereof.

Fig. 7 is a transverse sectional view through the strainer plate of Fig. 6 as seen from line 7—7 on said Fig. 6.

Fig. 8 is a longitudinal sectional view through the strainer plate taken at right angles to the plane of the section of Fig. 7 as seen from line 8—8 in said Fig. 6.

Fig. 9 is an enlarged fragmentary sectional view through the strainer plate adjusting mechanism taken on line 9—9 on Fig. 3.

Fig. 10 is a sectional view through the strainer plate adjusting mechanism taken on line 10—10 on said Fig. 9.

Fig. 11 is an enlarged fragmentary sectional view through the tumbling mechanism of the present invention and as seen, for example, from line 11—11 on Fig. 4.

Fig. 12 is a sectional view through one of the rakes and its mounting as seen, for example from line 12—12 on Fig. 11.

Fig. 13 is an enlarged sectional view through the driving mechanism or the tumbling device or rakes taken on line 13—13 on Fig. 4.

Fig. 14 is an enlarged fragmentary sectional view through the adjusting means for the discharge chute forming a detail of the invention and as seen from line 14—14 on Fig. 4.

Fig. 15 is an enlarged fragmentary sectional view through the discharge end of the machine and particularly illustrates the sparging mechanism which forms a detail of the invention and seen particularly from line 15—15 on Fig. 4.

Fig. 16 is a fragmentary sectional view taken at right angles to that of Fig. 15 on line 16—16 on said Fig. 15.

Throughout the several views of the drawings similar reference characters are employed to denote the same or similar parts.

As was intimated above, the strainer of the present invention is designed to more efficiently strain or separate liquids, such as syrup, wort or the like resulting from the boiling or other processing of solids such as hop flowers and cereal in the making of beer and such liquid having suspended therein the said solids. A strainer, per se, for this purpose is not new but strainers in the past were inefficient and unable to handle the quantity desired at the rate desired. Furthermore strainers as heretofore employed operated at a continuous rate wherefore there were times when insufficient time was allowed for the complete drainage of the liquid, syrup or wort from the solid particles prior to the discharge of said particles onto the refuse pile, or the time consumed in permitting this drainage was too great thereby slowing down the amount of material that could be passed through the strainer in an allotted time for straining.

By the present invention, and as will later be made clear, each of the foregoing disadvantages of prior strainers has been overcome in the strainer of the present invention. It should be further noted that the construction of the present strainer has not been unduly complicated to effect these advantages but instead the construction has been held to as simple as possible thereby producing an efficient yet economical strainer.

Figure 1:
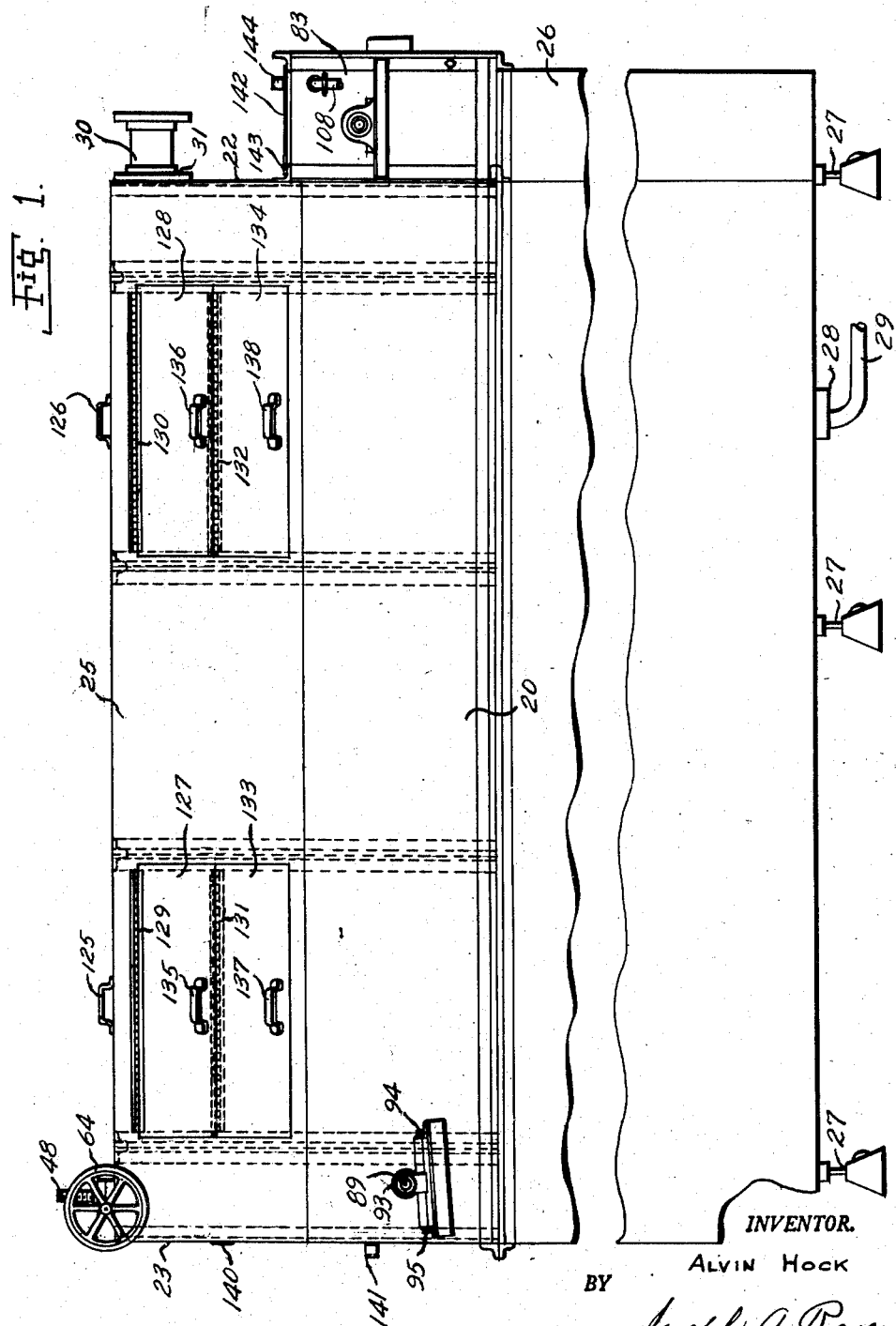
Fig. 1 is a front elevational view of a strainer embodying the improvements of this invention.
Figure 3:
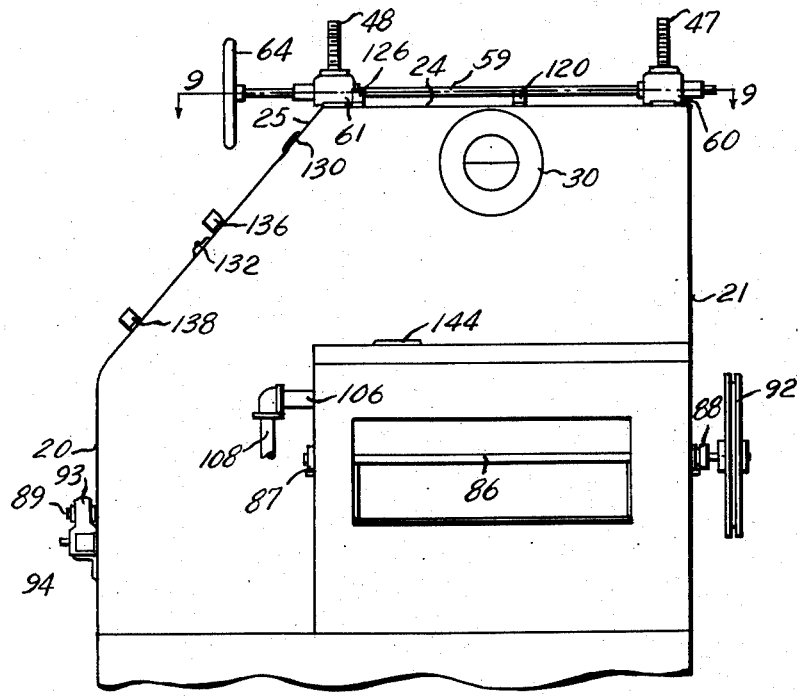
Fig. 3 is an end elevation of the strainer illustrated in Figs. 1 and 2 and seen particularly from the right hand end thereof.

Specifically, the strainer of the present invention comprises a housing including a front 20, a back 21, ends 22 and 23 and a top which includes portions 24 and 25. The housing has an open bottom which discharges into a receiving tank 26, illustrated most clearly in Fig. 4. The tank 26 takes any suitable or desirable form and is mounted on a solid support or as illustrated in Fig. 1 on appropriate but adjustable support, such as jack-screws 27, the tank 26 thereby supplies the bottom for the strainer housing and receives the liquid, syrup, wort or the like resulting from the strainer mechanism. The tank 26 is provided with an outlet 28 usually connected with a valve controlled pipe 29 which directs the contents 26 to the next stage in the processing of the material.

The strainer of the present invention will find one of its uses, as intimated above, in the brewing industry and hereinafter where reference is made to the material being strained, it will be referred to as wort and the solid particles will be designated as hop flowers while the liquid drained or strained from the hop flowers will be designated as syrup. It is to be understood, however, that the strainer of the present invention is not limited to the straining of wort but may be employed wherever a strainer is necessary or desirable.

The wort to be strained is delivered to the strainer from the brewing kettles through a pipe attached to coupling 30 carried by the end 22 of the housing. The coupling 30 is suitably attached to the end 22 by means of a flange 31 and the coupling 30 inwardly of the housing carries a distributing head or nozzle 32. The distributing head or nozzle 32 as seen in Figs. 4 and 5 has its outer end as a rectangular outlet 33 discharging onto the upper end of a strainer plate 34.

Figure 5:
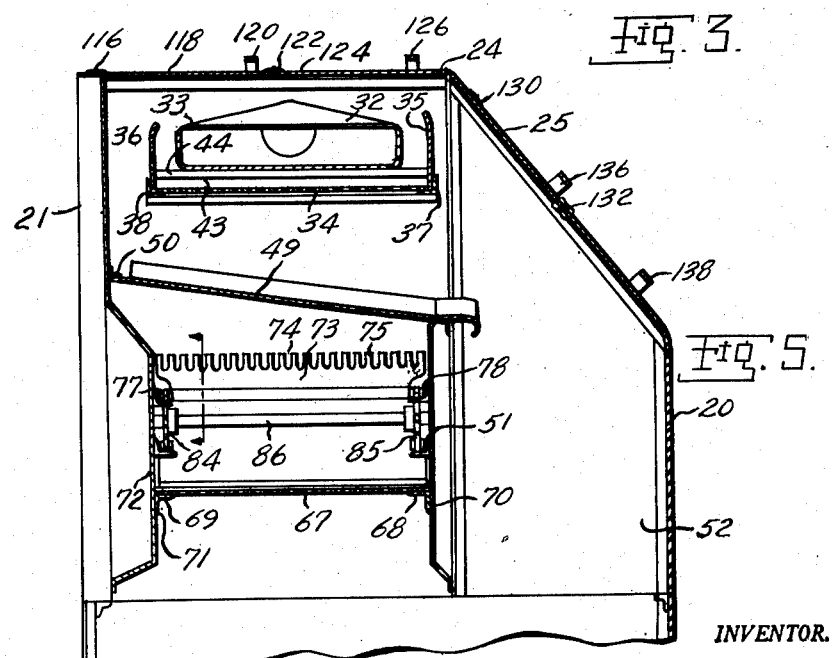
Fig. 5 is a transverse sectional view through the strainer of the present invention taken on line 5—5 on Fig. 4.

The strainer plate 34 is in effect the base or bottom of a trough which has upstanding sides 35 and 36, see Fig. 5. In order to connect the trough bottom 34 and sides 35 and 36 to one another use is made of angle-irons 37 and 38 each of which has one of its legs connected with one of the trough sides 35 and 36 and has its other leg underlying the strainer plate or trough bottom 34. As illustrated in the drawings, particularly Fig. 4, the strainer plate 34 is illustrated as of a continuous length but may be, and in practice is, a series of short sections supported on the angle-irons 37 and 38 and abutted one section against the next.

The strainer plate 34 may be of any accepted or desirable construction, usually of the construction illustrated in Figs. 6, 7, and 8. This construction comprises the formation, axially or longitudinally of the plate of a series of elongated apertures 39 of considerably greater length than width. Each aperture 39, on the under side of the plate is materially flared, outwardly, as illustrated at 40 in Figs. 7 and 8.

The entrance end of the strainer plate 34 is arranged to be hingedly connected to a bar 41 which extends transversely of the housing. Any suitable or desirable means may be employed for effecting this hinge connection, such as illustrated in the drawing as comprising the formation or attachment to the plate 34 of eyes 42 through which extends the bar 41. Upstanding from this hinged end of the strainer plate 34 is an end plate 43 having its upper edge reinforced as at 44 to act as a rest or support for the inner end of distributor head or nozzle 32.

The outer or discharge end of the strainer plate 34 and its sides 35 and 36 stop short of the end wall 23 of the housing while the angle-irons 37 and 38 project therebeyond. Each of said angle irons is provided in its vertical leg with an aperture to receive a pivot pin 45 that, respectively, extends through an eye 46 at the lower end, respectively, of screws 47 and 48. The said screws 47 and 48 act as hangers for the inner end of the strainer plate 34 and for vertically adjusting this end of the strainer trough as will later be made clear.

Beneath the strainer plate 34 is a shelf or deflector plate 49 which has its one longitudinal edge hingedly connected at 50 to the back wall 21 of the strainer housing. The deflector plate 49 inclines from the back wall 21 of the housing toward the front wall 20 thereof transversely of the strainer housing. Just beyond the strainer trough, or the strainer plate 34 the deflector plate 49 stops and is supported by a supplemental wall 51 inwardly of the front wall 20. By this construction there is provided a passageway 52 between the front wall 20 and intermediate wall 51 and this passageway 52 is located immediately below the housing inclined top portion 25.

The operation of the mechanism thus far described is as follows:

The wort to be strained passes by gravity from the coupling 30 through the distributor or nozzle 32, which, as seen in Fig. 5, is of a width substantially equal to the width of the strainer plate 34. The wort flows by gravity from the entrance end to the discharge end of the strainer plate 34. During this flow the syrup passes through the apertures 39 in the plate 34 to be received by the inclined deflector plate 49 and directed to the passageway 52 for discharge into the tank 26.

The wort flowing along the strainer plate 34 and in passing therethrough is discharged from the discharge end thereof.

It has been found in some instances, that the wort from the brew kettle, and passing through the coupling 30, has such force that it moves with such speed that an insufficient amount of syrup drains through the strainer plate 34. By mounting the plate 34 on the hinge pin 41 it may be elevated to thereby cause the dissipation of some of the force and speed of the material traveling therealong, thereby permitting a greater amount of syrup to flow through the aperture 34.

It has also been found that the material may be flowing with such a small amount of force and little speed that it has difficulty reaching the discharge end of the strainer plate 39 and tends to pile up thereon between its sides 35 and 36 wherefore by inclining the plate 34 downwardly this material is caused to more rapidly reach the said discharge end of the strainer plate.

As was above stated the discharge end of the strainer plate is supported by screws 47 and 48 which are utilized to effect either an upward inclination or a downward inclination of the strainer plate 34. This adjustment is effected by axially shifting the said screws 47 and 48, for which purpose they are each threaded into a sleeve nut 53 and 54, respectively, pressed into a worm wheel or gear 55 and 56. The worm wheels 55 and 56, respectively, mesh with worms 57 and 58 keyed or formed integral with a shaft 59, which is located above the strainer housing top portion 24 and extends transversely thereof.

Each of the worm wheels 55 and 56 and their meshing worms 57 and 58 are housed in a suitable housing 60 and 61 bolted or otherwise secured to the housing top portion 24. Said housings 60 and 61 provide bearings for the shaft 59, preferably, having journaled therein the bearing ends 62 and 63 one each of the worms 57 and 58. The worm shaft 59 projects beyond the housing top portion 24 and has keyed or otherwise secured thereto a hand wheel 64 whereby the shaft 59 and its worms are actuated. Each of the housings 60 and 61, in addition, encloses a thrust bearing 65 which is abutted by the lower end of the sleeve nut 53 and 54.

From the foregoing, it will now be apparent that by rotating the worm shaft 59 through the hand wheel 64 and screws 47 and 48 are raised or lowered to correspondingly actuate the strainer trough and strainer plate 39 about its hinge mounting 41.

The wort being strained passes off of the strainer plate 34, onto a deflector plate 66 which has its one end connected to the end wall 23 of the housing and inclines inwardly and downwardly for correspondingly directing the wort from the said strainer plate 34. The wort upon leaving the deflector plate 66 is caught upon a second strainer plate 67.

The second strainer plate 67 is fixed to have an upward inclination longitudinally of the strainer housing. The said strainer plate 67 may take any suitable or desirable construction, such for example, as the material of which the strainer plate 34 was formed, as above described and illustrated in Figs. 6, 7, and 8. The strainer plate 67 is mounted in position by angle-irons 68 and 69, each of which has its one leg 70 and 71 secured respectively, to the inner face of the back wall 20 and intermediate wall 51. As illustrated in Fig. 5 the angle-iron 69 has its leg 71 secured to one off set, inward, portion 72 of the said back wall 21. By this construction the strainer plate 67 forms with said intermediate wall 51 and back wall off set portion 72 a trough having a width substantially equal to the strainer trough above described and including the strainer plate 34 and sides 35 and 36. The strainer plate 67 is illustrated, as of a length substantially equal to the length of the strainer housing, but, similar to the strainer plate 34, may be formed of separate plates each of a relatively short length with their opposed edges in abutment.

It is on the strainer plate 67 that the hop flowers are tumbled to permit the drainage of syrup from pockets and other surfaces thereof which would not normally be subject to gravity drainage. In order to accomplish this tumbling, use is made of a plurality of pusher members of a substantially rakelike formation. As shown in Figs. 11 and 12 each of the pusher members 73 is provided in its free end with a plurality of slots 74 providing between adjacent slots a rakelike tooth 75. The ends of said rake teeth 75 are backwardly curved at 76, the purpose will be subsequently described.

In order to actuate the said rakes use is made of a pair of endless link-chains 77 and 78 located respectively adjacent the intermediate wall 51 and the back wall off set, 72. The chain 77 has its upper and lower reaches held in proper position by angle-brackets 79 and 80 each of which has a leg projecting inwardly to act as a shelf for the said chain reaches. Similarly, the chain 78 has its upper and lower reaches respectively supported by an inwardly projecting leg of angle-brackets 81 and 82 carried by the intermediate wall 51. At one end of the housing, preferably, within a supplemental housing 83, the chains 77 and 78 pass over sprockets 84 and 85 which are keyed or otherwise secured to a shaft 86. The shaft 86, see Fig. 2, is rotatably journaled in bearings 87 and 88 located exteriorly of the supplemental housing 83. The other ends of sprocket or link chains 77 and 78 are entrained about sprockets carried by a shaft 89. Shaft 89 is rotatably mounted in bearings 90 and 91 located respectively exteriorly of the front and back of the strainer housing.

The shaft 86 is the driving shaft and projects beyond the bearing 88 to have keyed or otherwise secured thereto a pulley 92 to receive a driving belt which extends from a suitable source of motive power, not shown. The shaft 89 is the idler shaft and in order to establish the necessary or desirable driving tension in the sprocket chains, its bearings 90 and 91 are each made in the form of a slide 93 capable of being adjusted to the right or left by adjusting screws 95 and 94.

From the foregoing it will be noted that the wort from the stainer plate 34 is deflected or directed by the deflector plate 66 onto the strainer plate 67 to have the hop flowers pushed or rolled up said strainer plate by suitable pusher members or rakes 73. It has been found that by presenting the rounded portion of the rake teeth 75 to the sodden hop flowers, the said flowers are rolled or tumbled along the strainer plate 67 thereby spilling any wort that may be in pockets or crevices therein. If the sharp ends of the said rake teeth 75 are employed the flowers are not tumbled but merely pushed along thereby not obtaining the results desired. Furthermore the pushing of the flowers en masse results in the breaking or tearing of said flowers with the result that the sap or juice therein is mixed with the syrup resulting in an undesirable taste in said syrup. This tumbling of the hop flowers up the strainer plate 67 is continuous until the discharge chute 96 is reached.

Any suitable or desirable means may be employed for attaching the rakes 73 to the chains 77 and 78; that shown in the drawings, consisting in bending the straight edge of each rake to be normal thereto and forming a flange 97. The ends of the flange 97 are riveted or otherwise secured to a projecting leg of angle-brackets 98 and 99 which are carried by opposed links in the sprocket chains 77 and 78.

When the material reaches the discharge chute 96 it may be desirable to temporarily slow up its discharge to permit a final drainage therefrom and at the same time it may be desirable to effect a sparging of these spent hop flowers. For these reasons the bottom 100 of the discharge chute 96 is adapted to be adjusted to an upper outward angle. The bottom 100, therefore, has its inner end hinged at 101 to the adjacent end of the strainer plate 67. In order to maintain the outer end of the discharge chute bottom 100 in position, the said bottom has secured to its undersurface at diametrically opposite points angle brackets 102 each having pivoted to one of its legs a link 103 provided with a plurality of apertures 104 spaced lengthwise of said link. The apertures 104 are adapted to be selectively mounted on a bolt 105 carried by the front and back sides of the supplemental housing 83.

Disposed within said supplemental housing 83 is the sparger which conveniently takes the form of a pipe 106 having its one end closed by a cap 107 and its other end connected to the sparging fluid supply pipe 108. The pipe sparger 106 is provided longitudinally thereof with a plurality of holes or apertures discharging a spray 109 into the discharge chute. Suitable brackets 110 and 111 are provided by holding the sparging pipe 106 in position. These brackets may take any suitable or desirable construction, such for example, as illustrated in Fig. 16 and including a mounting flange 112 from which depends a tie rod 113 carrying at its end separable pipe clamp 114.

The operation of the strainer has been described throughout the specifications in connection with the mechanical construction of its elements and parts.

As was noted above it is of prime importance that the strainer be kept in a thoroughly clean condition at all times and in order to effect this suitable entrance doors are provided. As seen in Figs. 1 and 2, the housing portion 24 has hinged thereto, at 115 and 116, doors 117 and 118 each provided with a handle 119 and 120. Each of said doors 117 and 118 has hinged thereto at 121 and 122 supplemental or sectional doors 123 and 124 each, again, provided with a handle 125 and 126. It will readily be seen that the doors 117, 118, 123 and 124 may be opened so that access can be had to the strainer trough strainer plate 34 and its sides 35 and 36. The housing top portion 25 is likewise provided with door sections 127 and 128 each of which is respectively hinged at 129 and 130 to the said top portion 25 and each of such door sections 127 and 128 having at its other end a hinge 131 and 132 for connecting therewith door sections 133 and 134. Each of the door sections 127, 128, 133 and 134 is supplied with a handle 135, 136, 137 and 138 whereby they may be actuated. These last mentioned door sections permit access to the passageway 52 as well as the syrup deflector plate 49 to effect the thorough cleaning thereof. Since the syrup deflector plate 49 has its one end hinged it may be actuated about the hinge 50 to permit access to the strainer plate 67 and the trough of which it forms a part, as well as, to the pusher or rake members 73. The end wall 23 is likewise provided with a door 139 hinged at 140 to the said end wall 23 with said door being provided with a handle 141 to permit and effect its operation. This door 139 enables the operator to have access to that end of the machine in order to insure cleanliness in the remote corner thereof. The sparger mechanism and discharge chute 96 are cleanable through a door 142 which is hinged at 143 and operable through a handle 144. The door 142 forms a part of the top or cover of the supplemental housing 83.

From the foregoing it will now be appreciated that there has been provided a strainer that accomplished the object initially set forth.

What is claimed is:

1. In a device for straining liquid from solid materials the combination of a housing constituting at its lower end a tank, a strainer trough within said housing at a point above the tank portion of the housing and said strainer trough having a perforated bottom, means for delivering material to be strained to the strainer trough, means directing the liquid separted from the material by the strainer trough into the housing tank, a second strainer plate within the housing located intermediate the strainer trough and the portion of the housing forming the tank, means for directing the material to be strained from the strainer trough to the second strainer plate, said second strainer plate inclining upwardly to its discharge end, a plurality of pushers carried by the housing above and movable along the upper surface of the second strainer plate engaging and moving the material along and upwardly of the second strainer plate, and means at the upper end of the second strainer plate for retarding the discharge of the material from said second strainer plate, comprising a discharge chute having a bottom hinged at its inner end, and means for adjusting said bottom about its hinge to an upward angle with respect to the second strainer plate.

2. In a device for straining liquid from solid materials the combination of a housing comprising a front, a back, ends and a top, said top extending from end to end of the housing and having a part laterally of the ends which is normal to the front and back and overlying a portion of the housing and a remaining lateral part which inclines and overlies the remaining portion of the housing, a strainer trough within said housing portion beneath the flat part of the top and said strainer trough including a perforated bottom, means for delivering material to be strained to the strainer trough, an inclined liquid deflecting plate beneath the strainer trough for receiving strained liquid from the strainer trough and deflecting said liquid toward the housing portion beneath the inclined top part thereof, a second strainer plate beneath the liquid deflecting plate for receiving the material from the strainer trough, said second strainer plate inclining upwardly, a discharge chute at the end of the second strainer plate upwardly inclined with respect to said second strainer plate and acting as a means for retarding the discharge of the material from the said second strainer plate, and a plurality of pushers movable along the upper surface of the second strainer plate for positively engaging and moving the material up said second strainer plate.

3. In a device for straining liquid from solid materials the combination of a housing comprising a front, a back, ends and a top, said top extending from end to end of the housing and having a part laterally of the ends which is normal to the front and back and overlying a portion of the housing and a remaining lateral part which inclines and overlies the remaining portion of the housing, a strainer trough within said housing portion beneath the flat part of the top and said strainer trough including a perforated bottom, means for delivering material to be strained to the strainer trough, an inclined liquid deflecting plate beneath the strainer trough for receiving strained liquid from the strainer trough and deflecting said liquid toward the housing portion beneath the inclined top part thereof, a second strainer plate beneath the liquid deflecting plate for receiving the material from the strainer trough, said second strainer plate inclining upwardly, a discharge chute including a bottom at the end of the second strainer plate, a plurality of pushers movable along the upper surface of the second strainer plate for positively engaging and moving the material up said second strainer plate, and means mounting the discharge chute bottom relative to said discharge chute for adjustment to upwardly incline with respect to the second discharge chute so that the material is retarded in its movement through the discharge chute.

4. In a device for straining liquid from solid materials the combination of a housing comprising a front, a back, ends and a top, said top extending from end to end of the housing and having a part laterally of the ends which is normal to the front and back and overlying a portion of the housing and a remaining lateral part which inclines and overlies the remaining portion of the housing, a strainer trough within said housing portion beneath the flat part of the top and said strainer trough including a perforated bottom, means for delivering material to be strained to the strainer trough, an inclined liquid deflecting plate beneath the strainer trough for receiving strained liquid from the strainer trough and deflecting said liquid toward the housing portion beneath the inclined top part thereof, a second strainer plate beneath the liquid deflecting plate for receiving the material from the strainer trough, said second strainer plate inclining upwardly, a discharge chute at the end of the second strainer plate upwardly inclined with respect to said second strainer plate and acting as a means for retarding the discharge of the material from the said second strainer plate, a plurality of pushers movable along the upper surface of the second strainer plate for positively engaging and moving the material up said second strainer plate, and a sparger above said discharge chute for sparging the material therein prior to its discharge therefrom.

5. In a device for straining liquid from solid materials the combination of a housing comprising a front, a back, ends and a top, said top extending from end to end of the housing and having a part laterally of the ends which is normal to the front and back and overlying a portion of the housing and a remaining lateral part which inclines and overlies the remaining portion of the housing, a strainer trough within said housing portion beneath the flat part of the top and which strainer trough includes a perforated bottom, means for delivering material to be strained to the strainer trough, an inclined liquid deflecting plate beneath the strainer trough for receiving strained liquid from the strainer trough and deflecting said liquid toward the housing portion beneath the inclined top part thereof, a second strainer plate beneath the liquid deflecting plate for receiving the material from the strainer trough, said second strainer plate inclining upwardly, a discharge chute including a bottom at the end of the second strainer plate, a plurality of pushers movable along the upper surface of the second strainer plate for positively engaging and moving the material up said second strainer plate, a sparger above said discharge chute for sparging the material therein prior to its discharge therefrom, and means mounting the discharge chute bottom relative to said discharge chute for adjustment to an upwardly and outwardly inclining angle for retarding the movement of the material through the discharge chute to permit the sparging thereof.

6. In a device for straining liquid from solid materials the combination of a housing comprising a front, a back, ends and a top, said top extending from end to end of the housing and having a part laterally of the ends which is normal to the front and back and overlying a portion of the housing and a remaining lateral part which inclines and overlies the remaining portion of the housing, a strainer trough within said housing portion beneath the flat part of the top and which strainer trough includes a perforated bottom, means for delivering material to be strained to the strainer trough, an inclined liquid deflecting plate beneath the strainer trough for receiving strained liquid from the strainer trough and deflecting said liquid toward the housing portion beneath the inclined top part thereof, a second strainer plate beneath the liquid deflecting plate for receiving the material from the strainer trough, said strainer trough having the receiving end thereof hingedly mounted, and means at the discharge end of the strainer trough for actuating it about its hinge whereby its inclination may be varied to increase or decrease gravity flow therethrough.

7. In a device for straining liquid from solid materials the combination of a housing comprising a front, a back, ends and a top, said top extending from end to end of the housing and having a part laterally of the ends which is normal to the front and back and overlying a portion of the housing and a remaining lateral part which inclines and overlies the remaining portion of the housing, a strainer trough within said housing portion beneath the flat part of the top and which strainer trough includes a perforated bottom, means for delivering material to be strained to the strainer trough, an inclined liquid deflecting plate beneath the strainer trough for receiving strained liquid from the strainer trough and deflecting said liquid toward the housing portion beneath the inclined top part thereof, a second strainer plate beneath the liquid deflecting plate for receiving the material from the strainer trough, said second strainer plate inclining upwardly, a discharge chute including a bottom at the end of the second strainer plate, a plurality of pushers movable along the upper surface of the second strainer plate for positively engaging and moving the material up said second strainer plate, said strainer trough having the receiving end thereof hingedly mounted, means at the discharge end of the strainer trough for actuating it about its hinge whereby its inclination may be varied to increase or decrease gravity flow therethrough, a sparger above said discharge chute for sparging the material therein prior to its discharge therefrom, and means for mounting the discharge chute bottom relative to said discharge chute for adjustment to an upwardly and outwardly inclining angle for retarding movement of the material through the discharge chute to permit the sparging thereof.

8. In a device for straining liquid from solid materials the combination of a housing comprising a front, a back, ends and a top, said top extending from end to end of the housing and having a part laterally of the ends which is normal to the front and back and overlying a portion of the housing and a remaining lateral part which inclines and overlies the remaining portion of the housing, a strainer trough within said housing portion beneath the flat part of the top and which strainer trough includes a perforated bottom, means for delivering material to be strained to the strainer trough, an inclined liquid deflecting plate beneath the strainer trough for receiving strained liquid from the strainer trough and deflecting said liquid toward the housing portion beneath the inclined top part thereof, a second strainer plate beneath the liquid deflecting plate for receiving the material from the strainer trough, said second strainer plate inclining upwardly, a discharge chute including a bottom at the end of the second strainer plate, a plurality of pushers movable along the upper surface of the second strainer plate for positively engaging and moving the material up said second strainer plate, said strainer trough having the receiving end thereof hingedly mounted, means at the discharge end of the strainer trough for actuating it about its hinge whereby its inclination may be varied to increase or decrease gravity flow therethrough, a sparger above said discharge chute for sparging the material therein prior to its discharge therefrom, and means for mounting the discharge chute bottom relative to said discharge chute for adjustment to an upwardly and outwardly inclining angle for retarding movement of the material through the discharge chute to permit the sparging thereof, said strainer trough adjusting means including a pair of elevating screws, one connected with each corner of the trough at the discharge end thereof, a sleeve nut on each elevating screw, and means for simultaneously actuating said sleeve nuts.

9. In a device for straining liquid from solid materials the combination of a housing comprising a front, a back, ends and a top, said top extending from end to end of the housing and having a part laterally of the ends which is normal to the front and back and overlying a portion of the housing and a remaining lateral part which inclines and overlies the remaining portion of the housing, a strainer trough within said housing portion beneath the flat part of the top and which strainer trough includes a perforated bottom, means for delivering material to be strained to the strainer trough, an inclined liquid deflecting plate beneath the strainer trough for receiving strained liquid from the strainer trough and deflecting said liquid toward the housing portion beneath the inclined top part thereof, a second strainer plate beneath the liquid deflecting plate for receiving the material from the strainer trough, said second strainer plate inclining upwardly, a discharge chute at the upper ends of the second strainer plate, and a plurality of pushers movable along the upper surface of the second strainer plate for positively engaging and moving the material up said second strainer plate to the discharge chute, said material moving means including a rake-like pusher member, and power actuated flexible means for actuating the rake-like pusher member.

10. In a device for straining liquid from solid materials the combination of a housing comprising a front, a back, ends and a top, said top extending from end to end of the housing and having a part laterally of the ends which is normal to the front and back and overlying a portion of the housing and a remaining lateral part which inclines and overlies the remaining portion of the housing, a strainer trough within said housing portion beneath the flat portion of the top and which strainer trough includes a perforated bottom, means for delivering material to be strained to the strainer trough, an inclined liquid deflecting plate beneath the strainer trough for receiving strained liquid from the strainer trough and deflecting said liquid toward the housing portion beneath the inclined top part thereof, a second strainer plate beneath the liquid deflecting plate for receiving the material from the strainer trough, said second strainer plate inclining upwardly, a discharge chute at the upper end of the second strainer plate and a plurality of pushers movable along the upper surface of the second strainer plate for positively engaging and moving the material up said second strainer plate to the discharge chute, said material moving means including rake-like pusher members having teeth with the lower ends of said teeth bent opposite to the direction of movement, a link chain connected to the opposite ends of the rake-like pusher members for actuating them, and a power actuated driving sprocket for simultaneously actuating said chains.

ALVIN HOCK.

REFERENCES CITED

The following references are of record in the file of this patent:

UNITED STATES PATENTS

| Number | Name | Date |
| --- | --- | --- |
| 293,983 | Roper | Feb. 19, 1884 |
| 620,045 | Morley et al. | Feb. 21, 1899 |
| 907,947 | Asplund | Dec. 29, 1908 |
| 984,434 | Laubenheimer | Feb. 14, 1911 |
| 1,320,324 | Dunkle | Oct. 28, 1919 |
| 1,789,425 | Cabrera | Jan. 20, 1931 |
| 1,997,915 | Rafton | Apr. 16, 1935 |
| 2,014,834 | Coffey et al. | Sept. 17, 1935 |
| 2,081,240 | Knapp et al. | May 25, 1937 |
| 2,158,169 | Wright | May 16, 1939 |
| 2,329,333 | Carter | Sept. 14, 1943 |
| 2,412,400 | Hock | Dec. 10, 1946 |